April 18, 1961 T. CARRIGAN 2,979,983
HEADLAMP TESTING APPARATUS
Filed March 25, 1957 6 Sheets-Sheet 1

FIG_1

INVENTOR
TRACY CARRIGAN
BY Hans G. Hoffmeister.
ATTORNEY

April 18, 1961 T. CARRIGAN 2,979,983
HEADLAMP TESTING APPARATUS
Filed March 25, 1957 6 Sheets-Sheet 3

INVENTOR
TRACY CARRIGAN
BY Hans G. Hoffmeister
ATTORNEY

April 18, 1961 T. CARRIGAN 2,979,983
HEADLAMP TESTING APPARATUS
Filed March 25, 1957 6 Sheets-Sheet 4

FIG_4

INVENTOR
TRACY CARRIGAN
BY Hans G. Hoffmeister
ATTORNEY

April 18, 1961 T. CARRIGAN 2,979,983
HEADLAMP TESTING APPARATUS
Filed March 25, 1957 6 Sheets-Sheet 5

INVENTOR
TRACY CARRIGAN
BY Hans G. Hoffmeister
ATTORNEY

April 18, 1961 T. CARRIGAN 2,979,983
HEADLAMP TESTING APPARATUS
Filed March 25, 1957 6 Sheets-Sheet 6

FIG-7

INVENTOR
TRACY CARRIGAN
BY Hans G. Hoffmeister
ATTORNEY

United States Patent Office 2,979,983
Patented Apr. 18, 1961

2,979,983

HEADLAMP TESTING APPARATUS

Tracy Carrigan, Lansing, Mich., assignor to Food Machinery and Chemical Corporation, San Jose, Calif., a corporation of Delaware Filed Mar. 25, 1957, Ser. No. 648,142

17 Claims. (Cl. 88—14)

This invention appertains to apparatus for testing the headlamps of vehicles.

It is necessary to test periodically the headlamps of vehicles to determine whether they conform to certain requirements prescribed by law for public safety on the highway. One factor to be determined is the direction of the light beam with respect to the direction of travel of the vehicle.

Accordingly, an object of the present invention is to provide an improved apparatus for testing the adjustment of a vehicle headlamp.

Another object is to provide a headlamp tester wherein vertical adjustments to compensate for variations in floor inclination are made quickly and with a minimum of effort.

Another object of the present invention is to provide an improved device for facilitating the aligning of a headlamp tester with the vehicle whose headlamps are to be tested.

Another object is to provide a carriage for a portable headlamp tester that can be moved with ease from one headlamp to another without disturbing the adjusted position of the mechanisms mounted on the carriage.

Other objects and advantages of the present invention will become apparent from the following description and drawings, in which.

The headlamp testing apparatus of the present invention is used in testing the adjustment of a headlamp 10 (Fig. 1) of a vehicle 11, so that, after adjustment, the headlamp beam is projected in the direction prescribed for public safety on the highway. As is well known, the conventional headlamp 10 includes a lens 12 disposed in a housing 13, which is universally mounted on the vehicle 11 for movement in both horizontal and vertical directions so that the necessary adjustments may be made.

Figure 8:
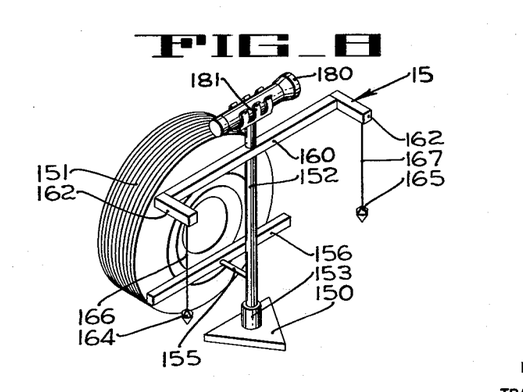
Fig. 8 is a perspective of the aiming device.

The headlamp testing apparatus comprises a headlamp tester 14 (Figs. 1 and 2) arranged to be positioned adjacent the forward end of the vehicle facing the headlamp to be tested, and an aiming device 15 (Figs. 1 and 8) which is positioned adjacent the rear tire that is located on the same side of the vehicle as the headlamp to be tested.

Figure 2:
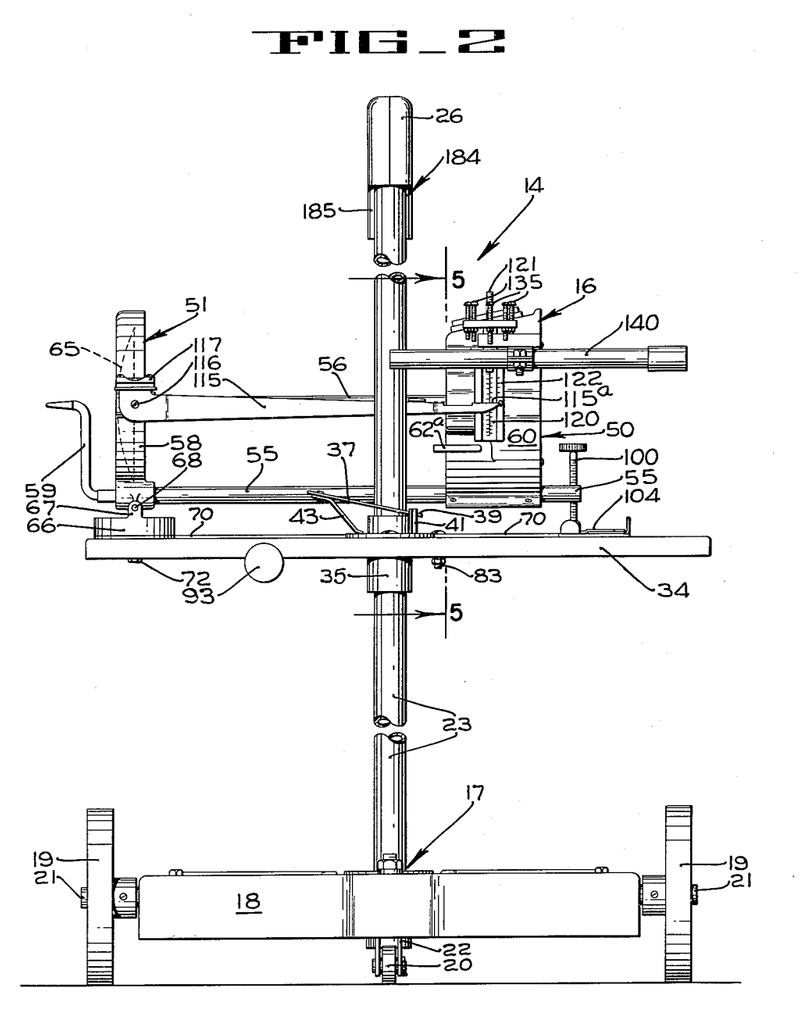
Fig. 2 is an enlarged fragmentary side elevation of the headlamp tester.
Figure 3:
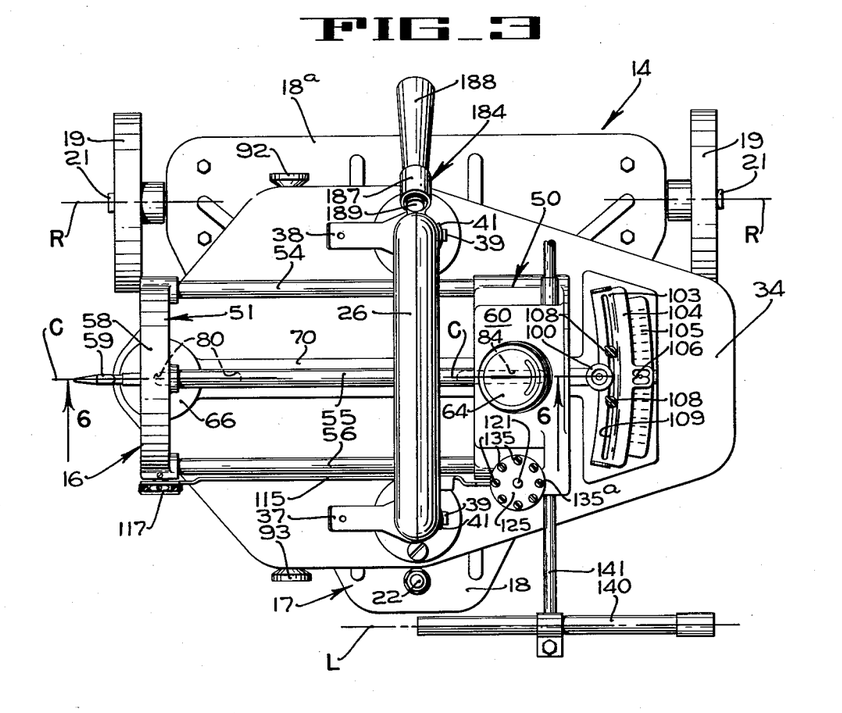
Fig. 3 is an enlarged plan of the headlamp tester.
Figure 4:
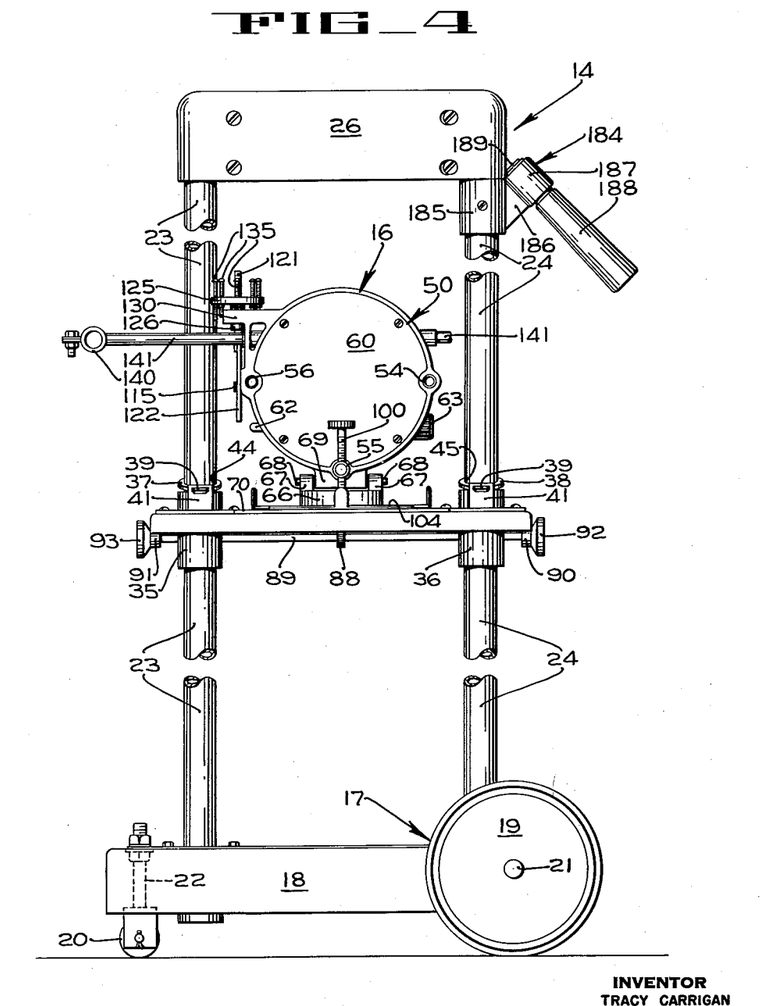
Fig. 4 is an enlarged fragmentary rear elevation of the headlamp tester.

As shown in Figs. 2 and 4, the tester 14 comprises a light beam direction indicating unit in the form of a light intensity indicating unit 16 that is mounted on a portable support stand 17 (Figs. 2 and 3), which stand includes a generaly triangular base 18 supported by two wheels 19 and a caster 20. The wheels 19 (Fig. 3) are rotatably mounted upon an axle 21 so as to be disposed at the extremities of one leg 18a of the triangular base 18. The caster 20 is mounted for pivoting movement by a swivel joint arrangement 22 disposed at the junction of the other legs of the triangular base 18. Extending vertically upward from the base 18 are two parallel tubular columns 23 and 24 (Fig. 4), which are interconnected at their upper end by a yoke 26.

To support the intensity indicating unit 16 at various fixed heights above the base 18 for accommodating the various heights of headlamps on different makes of automobiles, a vertically adjustable platform 34 (Figs. 2 and 4) is provided. Collars 35 and 36, which are rigid with the platform 34, are slidably disposed on the columns 23 and 24, respectively, and are retained in adjusted position thereon by means of clamp bars 37 and 38 (Figs. 2 and 4), respectively. Each clamp bar has an end portion 39 disposed in an aperture in a tab 41 secured to the associated collar. A suitable spring 43 is connected to the other end of each clamp bar and extends downwardly into engagement with the platform 34 to urge the associated clamp bar upwardly to an angularly disposed position. The clamp bars 37 and 38 are provided with apertures 44 and 45, respectively (Fig. 4), of suitable dimensions to receive individually the columns 23 and 24. When the clamps 37 and 38 are moved to an inclined position under the urgency of springs 43, the walls of the apertures grip the columns and retain the platform 34 in its adjusted vertical position. To raise or lower the platform 34, the operator presses down on the clamp members 37 and 38 to release the columns.

Figures 5, 6:
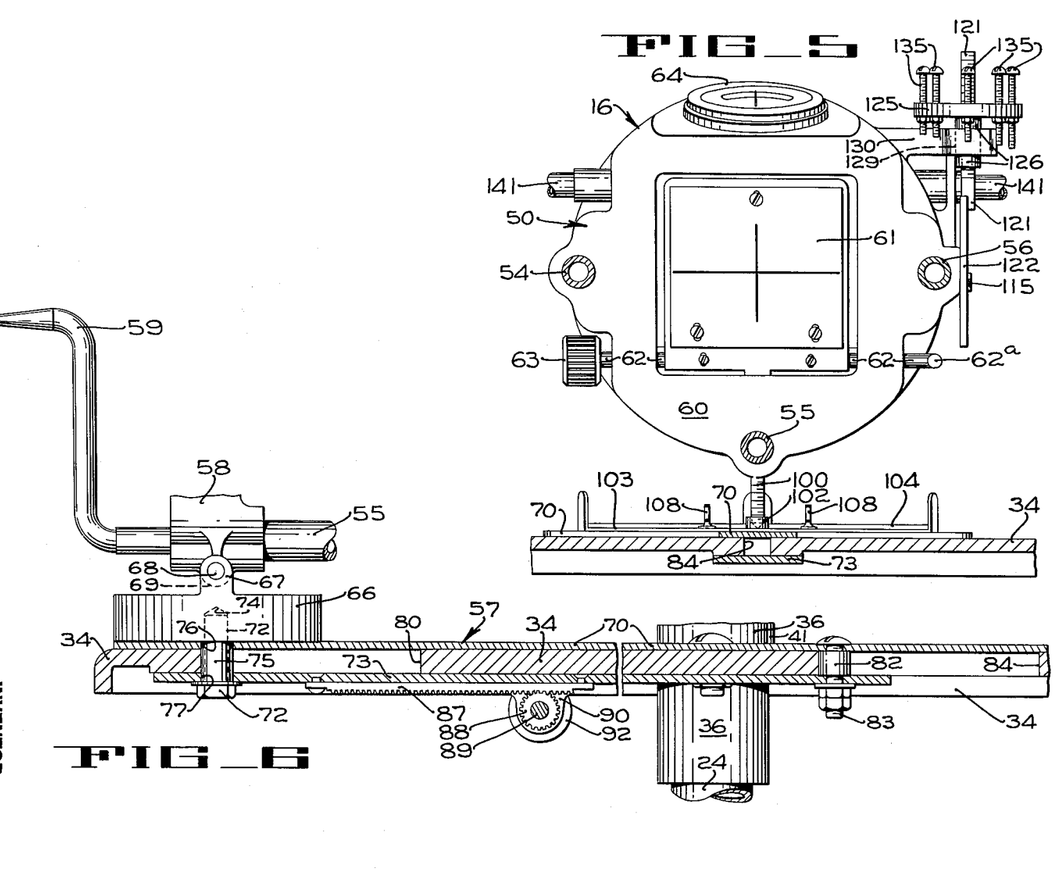
Fig. 5 is an enlarged section taken along line 5—5 of Fig. 2 to illustrate the target assembly of the headlamp tester.
Fig. 6 is an enlarged fragmentary section taken along line 6—6 of Fig. 3 particularly showing the drive mechanism for moving the headlamp tester longitudinally.

The light intensity indicating unit 16 comprises a photometer assembly 50 (Fig. 2), a lens assembly 51 that is connected to the photometer assembly by three fixed parallel rods 54, 55 and 56 (Fig. 5), and a carriage 57 (Fig. 6). The carriage 57 is connected to the photometer assembly 50 and to the lens assembly 51, and is slidably mounted on the platform 34. The three rods 54, 55 and 56 are parallel to the optical center line of the unit 16, and each rod has one end secured in a housing 60 of the photometer assembly 50 and the other end secured in a lens holder 58 (Fig. 2) of the lens assembly. At one end, the rod 55 has an offset extension 59 which is in alignment with the optical center line of the unit 16.

A target assembly 61 (Fig. 5) is mounted on a rod 62 over an opening on the forward face of the photometer housing 60. The rod 62, which has a control knob 63 at one end, is mounted for rotation in the walls of the housing and has a right angular projection 62a formed on the end opposite the knob. A spring (not shown) is connected between the target assembly and the photometer housing and is arranged to bias the target assembly to an upright light-intercepting position. The target may be used in its upright position during preliminary headlamp testing, while making coarse adjustment of the headlamps. Later it is pivoted to a horizontal position for more precise testing during the final adjustments. When the target is in horizontal position, the projection 62a counterbalances the urgency of the spring and maintains the target in the horizontal position. Mounted within the housing 60 and disposed behind the cross lines of the target when the target is in an upright position, is a suitable photoelectric cell, not shown. Electrically connected to the photoelectric cell in a conventional manner is a light intensity meter 64 mounted on the housing 60. When the target assembly is in the upright position, it protects the cell from physical damage and exposure to direct sunlight, or other strong light.

The lens assembly 51 includes a plano-convex lens 65 (Fig. 2) that is mounted in the lens holder 58 and is arranged to converge the rays of light emitted by the headlamp on the target 61 of the photometer assembly 50. The lens holder 58 is mounted for universal pivoting movement on the carriage 57 by means of a cylindrical base member 66 (Fig. 6) which has a pair of upstanding ears 67 (Fig. 4). A pin 68 extends through the ears 67 and through a boss 69 formed on the lower end of the lens holder to pivotally mount the holder on the carriage 57. The base member 66 rests on an upper plate 70 of the carriage 57, and a capscrew 72, which has its cap below a lower plate 73 of the carriage, is threaded into a tapped opening 74 in the base 66 to mount the base for rotary movement on the carriage 57.

As shown in Fig. 6, the carriage 57 is guided at one end, during its sliding movement on the platform 34, by means of a spacer tube 75 that has end portions disposed in apertures 76 and 77 in the upper and lower plates 70 and 73, respectively, and has an intermediate portion disposed in a slot 80 which is formed in the platform 34 and extends longitudinally thereof. At its other end, the carriage 57 is guided by means of a spacer tube 82 that is secured by a bolt 83 in a second slot 84 (Fig. 7) in the platform 34. Since the two slots 80 and 84 are in alignment and are disposed longitudinally of the platform 34, the sliding movement of the carriage and the other parts of the unit 16 mounted thereon is restricted to movement longitudinally of the platform.

The longitudinal guided movement of the unit 16 on the platform 34 is effected by means of a rack 87 (Fig. 6) secured to the underside of the lower plate 73 and a pinion 88 in mesh with the rack. The pinion 88 is keyed to a shaft 89 rotatably supported in ears 90 and 91 (Fig. 4) depending from the platform 34. A pair of manually actuated knobs 92 and 93 are secured to the shaft 89, one knob being disposed on each side of the platform 34. Thus, rotation of either of the knobs 92 and 93 causes guided movement of the light intensity indicating unit 16 relative to the platform 34.

The unit 16 is pivoted in a vertical direction about the pin 68 (Fig. 2) of the universal joint under the lens holder by means of a vertical adjustment screw 100 that is threaded through a tapped opening 101 (Fig. 7) in the rod 55. The lower end of the adjustment screw 100 is freely rotatable in a socket 102 that is welded to an adjusting plate 103. When the screw 100 is threaded in or out of the rod 55, the unit 16 will be pivoted in a vertical direction about the pivot pin 68.

The plate 103 has an upwardly offset forward portion 104 that overlies a scale 105 secured to the carriage 57. A pointer 106 formed on the offset portion 104 cooperates with the indicia on the scale 105 to indicate the position of the longitudinal axis of the unit 16, which corresponds to the optical center line of the unit, relative to the longitudinal center line of the carriage 57. The adjusting plate 103 is fastened in position on the carriage 57 by means of thumb screws 108 which extend through a slot 109 in the plate and are threaded into tapped holes (not shown) in the carriage 57. When the screws 108 are loosened, the adjusting plate may be adjusted relative to the scale 105 to cause the entire unit 16 to swing about the axis of the capscrew 72 at the other end of the unit. It is therefore apparent that the rod 55 and the plate 103, which carries the pointer form a horizontally adjustable indicating arm.

A second indicating arm 115 (Fig. 2) is mounted for pivotal adjusting movement in a vertical direction on the lens holder 58 by means of a capscrew 116. A spirit level 117 is secured on the end of the arm 115 above the capscrew 116. When an imaginary line, extending between the center of the capscrew 116 and the upper surface of a reference edge 115a on the free end of the arm 115, is disposed in a horizontal plane, the bubble in the spirit level is centered. The reference edge 115a is disposed closely adjacent a vertical scale 120 (Fig. 7) that is carried by a threaded post 121 and is slidably disposed in a guide housing 122 secured to the housing 60 of the photometer assembly 50 by capscrews (not shown). The scale 120 is calibrated in units, each of which indicates an inclination of the beam from the horizontal of one inch in 25 feet. A similarly calibrated scale 123 is inscribed on the fixed guide housing 122. The post 121 is threaded through an adjusting wheel 125 which has a hub 126 (Fig. 5) that is slidably disposed in an opening 129 in an arm 130 projecting outwardly from the housing of the photometer assembly 50. A plurality of screws 135 are threaded through the wheel 125 in angularly spaced relation. Each of the screws projects a different distance below the wheel 125, and the position of the wheel and the vertical scale 120 thereon will depend upon which of the screws is disposed in a socket 136 (Fig. 7) in the upper surface of the housing arm 130. The arm 130 is so designed that when any one of the screws is disposed in the socket 136, none of the other screws are in vertical alignment with any part of the arm. It is apparent that vertically adjustable rods may be suitably used in the place of screws 135.

A telescope 140 is clamped on the outer end of a laterally movable support arm 141 that is carried by and projects outwardly from the housing 60 of the photometer assembly 50. The telescope is so arranged that its line of sight is parallel to the optical center line of the light intensity indicating unit 16. Therefore, when the telescope is positioned in a plane parallel to the longitudinal center line of the vehicle, the optical center line of the unit is parallel to the longitudinal center line of the automobile.

The aiming device 15 is used to position the telescope parallel to the longitudinal center line of the vehicle. This device 15 comprises a base 150 (Figs. 1 and 8) that is placed on the floor adjacent the tire 151 of the rear wheel of the vehicle. A vertical tubular post 152 is supported on the base 150 in a universal joint 153. Fixedly secured to the post 152 is a laterally projecting support arm 155 which has a horizontal contact arm 156 mounted at its outer end. The contact arm 156 is positioned at a convenient height above the base 150 and is of suitable length to contact two points on the sidewall of the tire 151. When the contact arm 156 is disposed against the tire 151, it is parallel to the longitudinal center line of the vehicle.

Near the upper end of the vertical post 152 a rigid cross bar 160 is mounted in a position parallel to the contact arm 156. An arm 162 projects outwardly from each end of the bar 160, and plumb bobs 164 and 165 are suspended from strings or chains 166 and 167, respectively, at equal distances from the bar 160. With this arrangement, the two strings 166 and 167 are disposed in a plane parallel to the bar 160 and to the contact arm 156 and, accordingly, the strings provide a sighting line parallel to the center line of the automobile. When the telescope is aligned with the strings 166 and 167, the optical center line of the unit 16 is disposed parallel to the center line of the automobile.

A flashlight 180 is mounted parallel to the bar 160 in a spring clip 181 on the bar 160 by means of a stub shaft (not shown) that is rotatably disposed in the upper end of the vertical tubular post 152. When the contact arm 156 is disposed in contact with the tire, the flashlight bears against the fender of the automobile and adjusts itself to the inclination of the fender without disturbing the engagement of the contact arm 156 with the tire. In this manner, the flashlight stabilizes the aiming unit by providing a third point of contact with the automobile, and also prevents the rigid bar 160 from contacting the fender and disturbing the engagement of the contact arm 156 with the tire.

Referring to Fig. 3, it is to be noted that the light intensity indicating unit 16, the platform 34, and the support stand 17 are so arranged that the axis of rotation R of the wheels 19, the optical center line C of the unit 16, the line of sight L of the telescope 140, and the slots 80 and 84 in the platform 34 are all parallel to each other.

After the optical center line of the headlamp tester is made parallel with the longitudinal center line of the vehicle, and the headlamp on one side of the car has been tested, it is necessary to shift the tester to the other side of the car to test the other headlamp. In order that the tester may be moved without disturbing the parallel relation of the tester center line and the vehicle center line, a handle assembly 184 (Fig. 4) is provided, which includes a collar 185 adjustably secured on the column 24. Integrally formed with the collar 185 is an angular projection 186 having a sleeve 187 at the free end thereof. A handle grip 188, which has a stub shaft 189 mounted for rotation in the sleeve 187, is disposed at a 45 degree angle relative to the axis of the column 24. The tester is moved by pivoting it up on the wheels 19 and pushing on the handle grip 188. Since the grip is disposed midway between the wheels 19, as seen in Fig. 3, and since the grip is freely rotatable, no turning moment will be applied to the tester frame as the tester is rolled along on the wheels 19, which are of equal size. Accordingly, the optical center line of the unit will still be parallel to the longitudinal center line of the vehicle when the tester reaches a position in front of the other headlamp.

Figure 7:
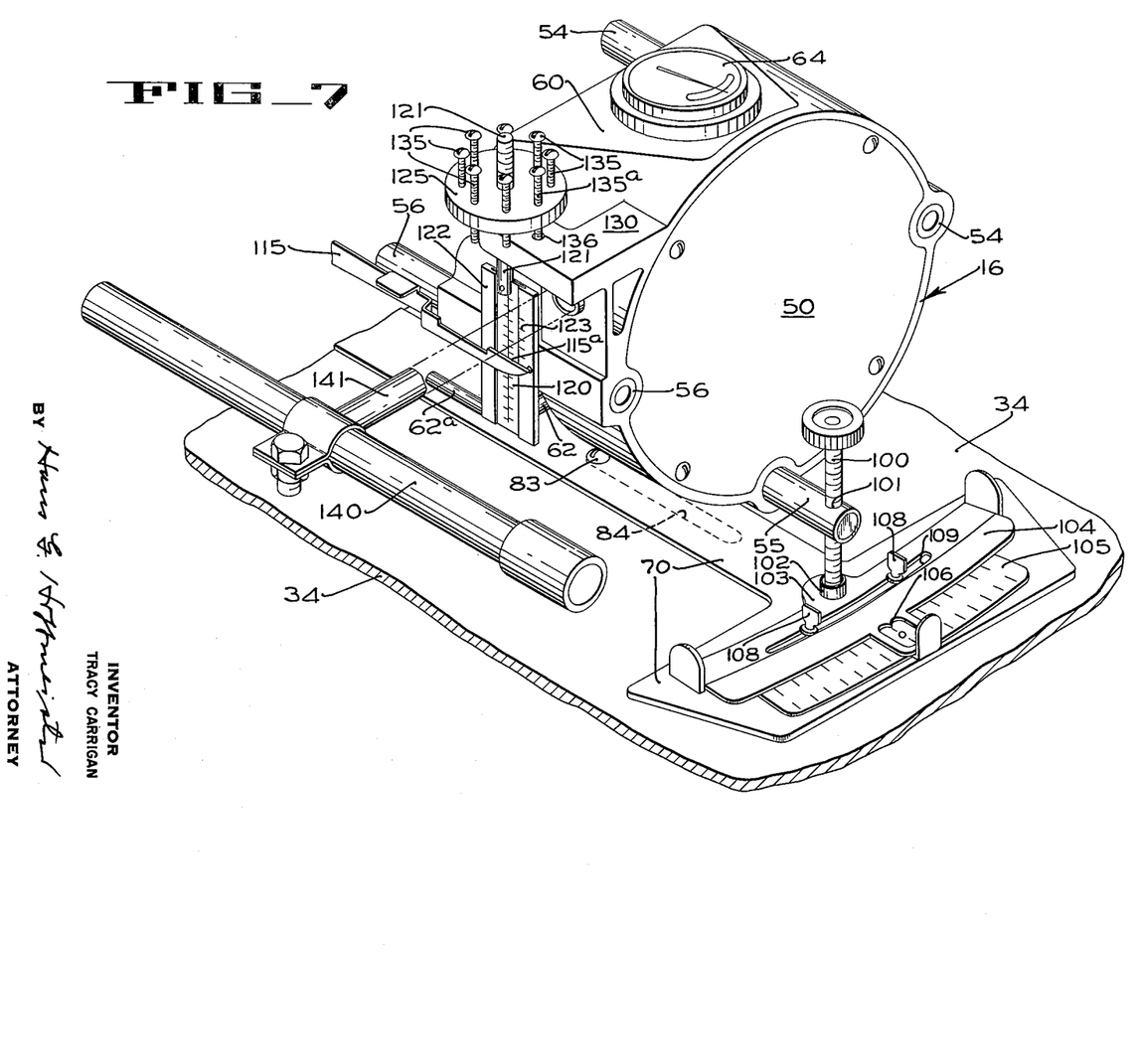
Fig. 7 is an enlarged fragmentary perspective of the target assembly particularly illustrating the movable scales adjacent thereto.

The operation of the tester 14 will be explained with reference to Figs. 2 and 7. At the factory, the "zero" mark is made on the fixed scale 123 so that this mark and the axis of the capscrew 116 are in a horizontal plane passing through the optical center line of the unit 16. Before any tests can be made with the tester, the optical center line must be put into parallelism with the support surface on which the tester rests. This is done by positioning the tester on a horizontal surface, aligning the indicating edge 115a of the arm 115 with the "zero" mark on the fixed scale, and then locking the arm 115 on the lens housing 58 by means of the capscrew 116. The thumb screw 100 is then manipulated until the bubble of the spirit level is centered. When this initial adjustment is made, the optical center line of the unit 16 is parallel to the axis of rotation of the wheels 19 and to the surface on which the tester rests.

Figure 1:
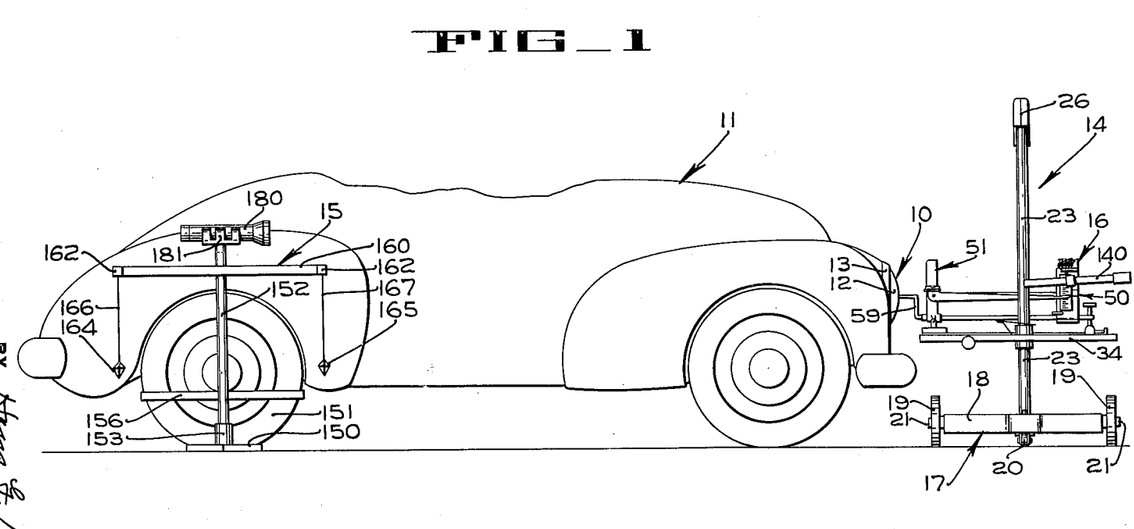
Fig. 1 is a side elevation of the headlamp testing apparatus embodying the present invention and illustrated in position for testing a headlamp of an automobile.

When a headlamp is to be tested, the automobile is driven into a testing stall and the tester 14 is moved into the stall and positioned in front of one of the headlamps, as shown in Fig. 1. If the floor of the stall is horizontal, the fixed scale 123 may be used to test the direction of projection of the beams of the headlamps since, as mentioned above, when the arm 115 is horizontal and is aligned with the "zero" mark on the fixed scale, the optical center line of the unit 16 is parallel to the automobile support surface. The tester is positioned in front of the headlamp and the platform 34 is adjusted vertically until the offset projection 59 at the forward end thereof is centrally disposed relative to the lens 12. The control knobs 92 and 93 are rotated to impart longitudinal movement to the platform 34 to move the projection 59 into close proximity to the surface of the lens 12. Then, when the aiming device 15 is set up against the rear tire on the same side of the vehicle as the headlamp being tested, the operator aligns the telescope with the reference line of sight established by the chains 166 and 167. As previously mentioned, this operation positions the optical center line of the unit parallel to the longitudinal center line of the vehicle and is accomplished by adjusting the telescope mounting arm 141 relative to the housing 60 and by maneuvering the tester on its wheeled support. The pointer 106 is then locked in position opposite the zero on scale 105. When these adjustments have been made, the optical center line of the unit is parallel to the longitudinal center line of the vehicle and is parallel to the floor on which the vehicle is supported.

As an example, consider a case where safety standards require that the beam of light be directed inwardly relative to the longitudinal axis of the vehicle at an angle corresponding to one inch in 25 feet of projected length, and be directed downwardly relative to the vehicle support surface at an inclination of one inch in 25 feet of projected length.

The unit is adjusted, so that the desired inward angle is obtained, by loosening thumb screws 108 and pivoting the unit 16 about the axis of capscrew 72 until the pointer 106 is aligned with the inner reference mark "one" on scale 105. The optical center line of the unit is then inclined inwardly at the desired angle. When the headlamp is brought to focus by means of the photometer in a manner that will be described presently, the beam will be directed inwardly at the desired angle.

The unit is adjusted, so that the desired vertical declination of the beam may be obtained, by loosening screw 116 and pivoting the indicator arm 115 (Fig. 2) upwardly until the indicator edge 115a is alligned with the "1" on the fixed scale 123. The screw 116 is tightened and thumb screw 100 is then rotated to pivot the unit 16 downwardly until the bubble in the level 117 is again centered. It will be apparent that, since the arm 115 was pivoted upwardly one scale unit away from the horizontal "zero" position, the optical center line of the unit 16 will now be inclined downwardly and forwardly one scale unit which corresponds to an inclination of one inch per 25 feet of projected length of the beam.

The headlamp is turned on and is adjusted in its socket until a maximum reading is indicated on the dial of the meter 64. When the maximum reading is obtained, the projected beam is in alignment with the optical center line of the unit 16 and is, therefore, directed inwardly and downwardly at an angle corresponding to one inch per 25 feet of length.

Some testing stalls are inclined relative to the horizontal. As explained above, in testing a headlamp, the operator first puts the indicator arm 115 in a horizontal position opposite a "zero" mark, then pivots the arm 115a a predetermined angular distance away from the "zero" mark, locks the arm to the lens housing and then manipulates the thumb screw 100 to bring the arm 115 back to a horizontal position. It is evident that if the automobile and the tester are disposed on a sloping floor, the indicator arm 115 would be automatically displaced an angular distance corresponding to the slope of the floor, when it is locked in position opposite the "zero" mark of the fixed scale. If the slope of the floor is known, this angular deviation from horizontal could be corrected for when the thumb screw 100 is manipulated to bring the arm 115 back to horizontal position. However, the adjusting screws 135 (Fig. 7) of the present invention provide a simple means whereby the indicator arm 115 may be quickly put into horizontal position opposite a "zero" mark when the tester is used in stalls having inclined floors.

For example, if stall No. 1 has an inclined floor, the tester is wheeled into the stall, the capscrew 116 (Fig. 2) is loosened, and the arm 115 is pivoted to a horizontal position, as determined by the spirit level 117. The arm is then locked on the lens housing 58 by means of the capscrew 116. The wheel 125 (Fig. 7) is rotated until one of the screws 135, for example the screw 135a, is disposed above the recess 136 in the support arm 130. The screw 135a is then adjusted in the wheel 125 until the "zero" mark on the movable scale 120 is opposite the indicating edge 115a of the locked arm 115. Therefore, whenever screw 135a is in recess 136, the "zero"

mark on the movable scale 120 is disposed at an elevation such that, when the edge 115a is aligned with the mark, the arm 115 will be horizontal.

It will now be apparent that, when a headlamp is tested in stall No. 1, the adjusting screw 135a is first disposed in the recess 136, the arm 115 is pivoted to a position above the "zero" mark on the movable scale 120 to preset the arm 115 at the angular deviation from the horizontal that is dictated by safety standards. The arm 115 is then locked on the lens housing and the thumb screw is manipulated to bring the arm to a horizontal position. Each adjusting screw 135 may be set to compensate for the slope of a different stall.

It will be understood that modifications and variations of the embodiment of the invention disclosed herein may be resorted to without departing from the spirit of the invention and the scope of the appended claims.

Having thus described my invention, what I claim as new and desire to protect by Letters Patent is:

1. In an apparatus for testing the adjustment of a vehicle headlamp, a platform, a light intensity indicating unit mounted on said platform for movement in a vertical plane, a scale member carried by said unit, means mounting said scale member for movement in a vertical plane relative to said unit, a scale arm adjustably mounted on said unit adjacent said scale member for movement in a vertical plane relative to said scale member and for disposition at a predetermined angular setting relative to the horizontal, and a level mounted on said scale arm whereby, when said scale arm is disposed to said unit at said predetermined angular setting, movement of said unit to position said scale arm in a horizontal plane places said unit in a desired aiming position.

2. In an apparatus for testing the adjustment of a vehicle headlamp, a platform adapted to be arranged in a position parallel to the supporting surface of a vehicle, a light beam direction indicating unit pivotally mounted on said platform and having an optical center line and adapted to be selectively disposed with its optical center line at any one of various angular settings relative to said platform, a scale member carried by said unit, means mounting said scale member for movement in a vertical plane relative to said unit, an adjustably mounted indicating arm carried by said unit adjacent said scale member and arranged to be positioned at a predetermined angular setting relative to the horizontal, and a level mounted on said adjustable indicating arm whereby, when said indicating arm is disposed on said unit at said predetermined angular setting, movement of said unit in a vertical plane to return said adjustable indicating arm to a horizontal position places said unit in a desired aiming position relative to the supporting surface of the vehicle.

3. In a headlamp testing apparatus for determining horizontal and vertical adjustment of a vehicle headlamp, a platform, a light intensity indicating unit mounted on said platform for movement in a horizontal and vertical plane, an adjustment member carried by said unit and disposed between said platform and said unit for variably positioning said unit in a vertical plane, a horizontal scale member supported by said platform, a horizontal indicating arm carried by said adjustment member and disposed above said scale member for indicating horizontal aiming position of said unit, a vertical scale member carried by said unit and arranged for movement in a vertical plane, a scale arm adjustably mounted on said unit adjacent said vertical scale member and arranged to be positioned at a predetermined angular setting relative to the horizontal for indicating desired vertical aiming position of said unit, and a level mounted on said last-mentioned scale arm whereby, when said scale arm is disposed on said unit at said predetermined angular setting, adjustment of said unit in a vertical plane by said adjustment member to return said scale arm to horizontal position places said unit in the desired vertical aiming position.

4. In an apparatus for testing the adjustment of a headlamp of a vehicle supported by a sloping surface, a platform adapted to be arranged parallel to the supporting surface of the vehicle, a light beam direction indicating unit pivotally mounted on said platform and having an optical center line and arranged to be disposed with said optical center line at any one of various angular settings relative to said platform, a scale carried by said unit for movement in a vertical plane, means on said unit for variably adjusting the vertical position of said scale relative to said unit, an adjustably mounted scale arm carried by said unit adjacent said scale and arranged to be positioned at a predetermined angular setting relative to the horizontal for indicating a desired angular displacement of the optical center line of said unit relative to said platform, and a level mounted on said scale arm whereby, when said scale arm is disposed on said unit at said predetermined angular setting, movement of said unit in a vertical plane to position said scale arm in a horizontal plane places said unit in a desired aiming position relative to the supporting surface of the vehicle.

5. In an apparatus for testing the adjustment of a headlamp of a vehicle supported on a sloping surface, a platform adapted to be arranged parallel to the supporting surface, a lens housing universally mounted on said platform and having an optical center line and arranged with said center line disposed at any one of various angular settings relative to said platform, a target housing rigidly supported by said lens housing, an indexing wheel movably carried by said target housing and adapted to be positioned thereon at any one of various heights, a scale adjustably supported by said indexing wheel for movement to a selected height, and means operative in response to the positioning of said wheel for adjusting said scale, a scale arm adjustably mounted on said lens housing for movement in a vertical plane and disposed adjacent said scale member at a predetermined angular setting relative to the horizontal for indicating a desired angular displacement of the optical center line relative to said platform, and a level mounted on said scale arm whereby, when said scale arm is disposed on said lens housing in said predetermined angular setting, movement of said lens housing in a vertical plane to return said scale arm to a horizontal position disposes said lens housing with its optical center line in a desired aiming position relative to the supporting surface of the vehicle.

6. A scale assembly for a headlamp testing apparatus comprising a housing, a multi-setting indexing wheel carried by said housing, a plurality of rods received by said wheel for positioning said indexing wheel at various heights above said housing and arranged around said indexing wheel so that one of said rods engages said housing at each setting of said indexing wheel, and a scale member adjustably supported by said wheel for postioning the scale member anyone of various heights.

7. A scale assembly for a headlamp testing apparatus comprising a housing having an apertured projection, a multi-setting indexing wheel having an internally threaded hub received by the aperture in said projection in sliding engagement, a threaded post received by said hub in threaded engagement, a plurality of rods received by said wheel and having lower surfaces disposed at various heights with respect to said indexing wheel and angularly spaced therearound so that one of said rods engages said projection at each setting of said indexing wheel, and a scale carried by said post for movement to various vertical positions in response to the setting of said indexing wheel.

8. In an apparatus for determining adjustment of a vehicle headlamp, a platform, a lens housing mounted on said platform for movement in a vertical plane, a target housing supported by said lens housing, an indexing wheel carried by said target housing and arranged for positioning thereon at different heights, a scale member supported by said indexing wheel and having the height thereof vary in response to the positioning of said wheel, a scale arm adjustably mounted on said lens housing for movement in a vertical plane and disposed adjacent said scale member at a predetermined angular setting relative to the horizontal for indicating a desired displacement of said target housing, and a level mounted on said scale arm whereby, when said arm is disposed on said lens housing, movement of said lens housing in a vertical plane to return said scale arm to a horizontal position places said target housing in a desired aiming position.

9. In an apparatus for determining adjustment of a vehicle headlamp, a platform, a lens housing mounted on said platform for movement in a vertical plane, a target housing supported by said lens housing, a multi-setting indexing wheel carried by said target housing, a plurality of screws received by said wheel and having lower end surfaces positioned at different distances below said indexing wheel, said screws being angularly spaced around said wheel so that one of said screws engages said target housing at each setting of said indexing wheel, a scale supported by said indexing wheel and having the height thereof vary in response to the setting of said wheel, and a scale arm adjustably mounted on said lens housing for movement in a vertical plane and disposed adjacent said scale member at a predetermined angular setting relative to the horizontal for indicating a desired displacement of said target housing, and a level mounted on said scale arm whereby, when said arm is disposed to said lens housing at said predetermined angular setting, movement of said lens housing to position said scale arm in a horizontal plane places said target housing in a desired aiming position.

10. In an automotive testing device, a portable support structure having a light beam direction indicating unit mounted thereon and adaptable for moving said indicating unit without disturbing the optical center line setting thereof, said support structure comprising a triangular base, a pair of wheels rotatably mounted at the extremities of one leg of said triangular base on an axis parallel to the optical center line of the unit, surface contacting means mounted at the junction of the other legs of said triangular base, an upstanding column supported by said base adjacent the axis of rotation of said wheels, and a rotatably mounted gripping device secured to said column for imparting movement to said structure and arranged for pivoting said structure about the axis of rotation of said wheels to facilitate the moving of said structure.

11. In an automotive testing device, a portable support structure having a light beam direction indicating unit mounted thereon and adaptable for moving said indicating unit without disturbing the optical center line setting thereof, said support structure comprising a base, a pair of wheels for supporting said base, an axle rotatably mounting said wheels and having the axis thereof parallel to the optical center line or said unit, surface contacting means mounted on said base for supporting said base, an upstanding column supported by said base in alignment with the midway point between said wheels, and a rotatably mounted gripping device secured to said column for imparting movement to said structure and arranged for pivoting said structure about the axis of rotation of said wheels to facilitate the moving of said structure.

12. In an apparatus for testing the adjustment of a headlamp of a vehicle supported on a sloping surface, a platform adapted to be arranged parallel to the supporting surface of the vehicle, a lens housing universally mounted on said platform and having an optical center line and arranged to be disposed with said center line at anyone of various angular settings relative to said platform, a target housing rigidly supported by said lens housing, a multi-setting indexing wheel carried by said target housing, a plurality of screws received by said wheel and having lower end surfaces disposed at different distances therebelow and arranged therearound so that one of said screws engages said target housing at each angular setting of said indexing wheel, a scale member supported by said indexing wheel, the height of the scale member being variable in response to movement of the wheel to compensate for deviation of said sloping which supporting surface from the horizontal, a scale arm adjustably mounted on said lens housing for movement in a vertical plane and disposed adjacent said scale member at a predetermined angular setting relative to the horizontal for indicating a desired angular displacement of the optical center line relative to said plateform, and a level mounted on said scale arm whereby, when said arm is secured on said lens housing in said predetermined angular setting, movement of said lens housing in a vertical plane to position said scale arm in a horizontal plane disposes said lens housing with its optical center line in a desired aiming position relative to the supporting surface of the vehicle.

13. A scale assembly for a head lamp testing apparatus comprising a housing, a support member carried by said housing, means mounting said support member for rotation relative to said housing for establishing a plurality of settings, a plurality of rods received by said support member and projecting different distances therefrom and arranged so that one of said rods engages said mounting means in response to a setting of said support member to retain said support member at any one of various heights, and a scale member adjustably carried by said support member for positioning at heights related respectively to said various heights of said support member.

14. In an apparatus for testing the adjustment of a vehicle headlamp, a platform, a light beam direction indicating unit mounted on said platform for movement in a vertical plane, a scale member carried by said unit, means mounting said scale member for movement in a vertical plane relative to said unit, and a scale arm carried by said unit adjacent said scale member and movable in a vertical plane relatively to said scale member for disposition at a predetermined angular setting relative to the horizontal whereby, when said scale arm is disposed in said predetermined setting, movement of said unit to position said scale arm in a horizontal plane puts said unit in a desired aiming position.

15. In an apparatus for determining adjustment of a vehicle headlamp, a platform, a lens housing mounted on said platform for movement in a vertical plane, a target housing supported by said lens housing, an indexing wheel carried by said target housing and adapted to be positioned thereon at a selected one of different heights relative to the target housing, a scale member adjustably supported by said indexing wheel for movement to a selected height, and means operative in response to positioning of said wheel for adjusting the scale member, a scale arm adjustably mounted on said lens housing for movement in a vertical plane, and releasable means for locking said scale member at a predetermined angular setting relative to the horizontal for indicating a desired position of said target housing, whereby, when said arm is locked on said lens housing, movement of said lens housing in a vertical plane to bring said scale arm to a horizontal position places said target housing in the desired aiming position.

16. In an apparatus for testing the adjustment of a headlamp of a vehicle supported on a sloping surface, a platform adapted to be arranged parallel to said supporting surface, a lens housing pivotably mounted on said platform and having an optical center line, said lens housing being adapted to be disposed with said center line at selected angular setting relative to said platform, a target housing rigidly supported by said lens housing, an indexing wheel movably carried by said target housing and adapted to be positioned thereon at selected height, a scale adjustably supported by said indexing wheel for movement to selected height, and means operative in response to positioning of said wheel for adjusting said scale, a scale arm adjustably mounted on said lens housing for movement in a vertical plane, releasable means for locking said scale member at a predetermined angular setting relative to the horizontal for indicating a desired angular position of said optical center line relative to said platform, and a level mounted on said scale arm, whereby, when said scale arm is locked on said lens housing in said predetermined angular setting, movement of said lens housing in a vertical plane to return said scale arm to a horizontal position disposes said lens housing with its optical center line in a desired aiming position relative to the supporting surface of the vehicle.

17. In an apparatus for testing the adjustment of a headlamp of a vehicle supported on a sloping surface, a platform adapted to be arranged parallel to the supporting surface of the vehicle, a lens housing pivotably mounted on said platform and having an optical center line, said lens housing being adapted to be disposed with said center line at any one of various angular settings relative to said platform, a target housing rigidly supported by said lens housing, an indexing wheel carried by said target housing, a plurality of rods carried by said wheel and having lower end surfaces at different distances below said indexing wheel and arranged therearound so that one of said end surfaces engages the target housing for each angular setting of the indexing wheel, a scale member supported by said indexing wheel, the height of the scale member being variable in response to movement of the wheel to compensate for deviation of said sloping vehicle supporting surface from the horizontal, a scale arm adjustably mounted on said lens housing for movement in a vertical plane, releasable means for securing said scale arm on said lens housing at a predetermined angular setting relative to the horizontal for indicating a desired angular relationship of the optical center line to said platform, and a level mounted on said scale arm, whereby, when said scale arm is secured on said lens housing in said predetermined angular setting, pivotal movement of said lens housing to position said scale arm in a horizontal plane disposes said lens housing with its optical center line in a desired aiming position relative to the supporting surface of the vehicle.

References Cited in the file of this patent

UNITED STATES PATENTS

| | | |
|---|---|---|
| 2,176,214 | Falge et al. | Oct. 17, 1939 |
| 2,176,215 | Falge | Oct. 17, 1939 |
| 2,215,224 | MacMillan | Sept. 17, 1940 |
| 2,261,741 | Mathieu | Nov. 4, 1941 |
| 2,411,879 | Holmes | Dec. 3, 1946 |